(12) United States Patent
Suzuki et al.

(10) Patent No.: US 8,936,869 B2
(45) Date of Patent: Jan. 20, 2015

(54) SEALED CELL AND METHOD OF MANUFACTURE THEREOF

(75) Inventors: Katsunori Suzuki, Nabari (JP); Mikio Oguma, Kumagaya (JP); Sho Matsumoto, Hitachinaka (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 197 days.

(21) Appl. No.: 13/575,060

(22) PCT Filed: Jan. 29, 2010

(86) PCT No.: PCT/JP2010/051252
§ 371 (c)(1),
(2), (4) Date: Oct. 10, 2012

(87) PCT Pub. No.: WO2011/092845
PCT Pub. Date: Aug. 4, 2011

(65) Prior Publication Data
US 2013/0022862 A1    Jan. 24, 2013

(51) Int. Cl.
*H01M 2/02* (2006.01)
*H01M 2/04* (2006.01)
*H01M 2/08* (2006.01)

(52) U.S. Cl.
CPC .................................. *H01M 2/0413* (2013.01)
USPC ........................................ 429/181; 29/623.2

(58) Field of Classification Search
CPC ........... H01M 2/02; H01M 2/04; H01M 2/08; H01M 2/0413
USPC ................. 429/163–187, 56; 29/623.1–623.5
See application file for complete search history.

(56) References Cited

FOREIGN PATENT DOCUMENTS

| JP | 2000-090892 A | | 3/2000 | |
|---|---|---|---|---|
| JP | 2007-213819 | * | 8/2007 | .............. H01M 2/04 |
| JP | 2007-213819 A | | 8/2007 | |
| JP | 2009-123375 A | | 6/2009 | |
| JP | 2001-126695 A | | 5/2010 | |

OTHER PUBLICATIONS

English Translation of JP 2007-213819.*

* cited by examiner

*Primary Examiner* — Patrick Ryan
*Assistant Examiner* — Kiran Quraishi
(74) *Attorney, Agent, or Firm* — Volpe and Koenig, P.C.

(57) ABSTRACT

A flange 37b of a cap case 37 is provided with protrusions 37c that, before being swaging, project upward from the flange 37b. When the flange 37b is swaged along an upper surface of the cap 3, the protrusion 37c projects along the upper surface of the cap 3 from the flange 37b toward a center of the cap 3. The cap case 37 is welded to the cap 3 by friction stir welding at a welding portion 37d located at a substantially center of the protrusion 37c. The protrusions 37c are formed approximately in a letter-T shape that is symmetric left and right, and width W2 of a connecting portion 37r in a cap circumferential direction is smaller than the maximum width W1. The rigidity of the connecting portion 37r against deformation is reduced by forming a portion with small width W1 at the connecting portion 37r.

4 Claims, 14 Drawing Sheets

SEALED CELL AND METHOD OF MANUFACTURE THEREOF

TECHNICAL FIELD

The present invention relates to a sealed cell, and to a method of manufacture thereof.

BACKGROUND ART

Sealed cells have been widely used for a long time in consumer electrical appliances, and recently, in particular, lithium cells have become very widely used. Since the energy density of lithium cells is high, their development as a power source for electric automobiles (EVs) and hybrid automobiles (HEVs) has progressed remarkably, and they are now required to conduct high electrical currents. For this purpose, with lithium cells, countermeasures have been developed for lowering the resistance of various components, in particular welding together a top cover and a diaphragm (a top cover casing) of a lid unit (a sealing lid) (refer to Patent Document #1) and so on.

CITATION LIST

Patent Literature

Japanese Laid-Open Patent Publication 2007-213819.

SUMMARY OF THE INVENTION

Technical Problem

With the lid unit of Patent Document #1, a flange is provided at the peripheral portion of the diaphragm, and this flange is crimped back and swaged to the top cover. And it is anticipated that the resistance will be lowered by welding the flange portion to the upper surface of the top cover. However, in the case of a lithium ion secondary cell that is used in a plug-in type hybrid automobile or an electric automobile for which high capacity is demanded, there is a requirement for lowering the resistance even further, since the current that flows is very high.

Solution to Problem (1) According to the 1st aspect of the present invention, it is characterized that a sealed cell comprises a generating unit, a cell container within which the generating unit is housed, and a sealing lid that seals the cell container, wherein: the sealing lid comprises a cap having an external positive terminal, and a cap case that is integrated with the cap; the cap case comprises a flange that is crimped back to a cap upper surface at an external periphery of the cap, and a protrusion for welding that projects from an inner circumferential edge of the flange toward a center of the cap; and the cap and the cap case are welded together at the protrusion for welding.

(2) According to the 2nd aspect of the present invention, it is characterized that in the sealed cell according to the 1st aspect, the protrusion for welding comprises a connecting portion that is connected to the flange, and an end portion that is widened out from the connecting portion towards the center of the cap.

(3) According to the 3rd aspect of the present invention, it is characterized that in the sealed cell according to the 2nd aspect, a length of the connecting portion in a circumferential direction of the cap case is made to be shorter than a length of the end portion in the circumferential direction.

(4) According to the 4th aspect of the present invention, it is characterized that in the sealed cell according to any one of the 1st through 3rd aspects, the protrusion for welding is welded to the cap by friction stir welding.

(5) According to the 5th aspect of the present invention, it is characterized that a method of manufacturing a sealed cell comprises: a process of manufacturing a generating unit; a process of manufacturing a sealing lid that seals a container of the cell; a process of electrically connecting together the generating unit, an external positive terminal of the sealing lid and an external negative terminal on a bottom surface of the cell after having loaded the generating unit into the cell container; and a process of sealing the cell container with the sealing lid after having loaded the generating unit into the cell container; wherein the process of manufacture of the sealing lid comprises: a process of manufacturing a cap having the external positive terminal; a process of manufacturing a cap case that is integrated with the cap, the cap case having a flange for swaging together the cap case and the cap, and a protrusion for welding together the cap case and the cap; and a process of swaging the flange to the cap so as to fix together the cap and the cap case by swaging, and integrating together the cap and the cap case by welding the protrusion for welding to the cap.

(6) According to the 6th aspect of the present invention, it is characterized that in the method of manufacturing a sealed cell according to the 5th aspect, the protrusion for welding is welded to the cap by friction stir welding.

(7) According to the 7th aspect of the present invention, it is characterized that in the method of manufacturing a sealed cell according to the 5th or 6th aspect, in the process of manufacture of the cap case, the protrusion for welding is formed so as to project from the flange along an upper surface of the cap.

(8) According to the 8th aspect of the present invention, it is characterized that in the method of manufacturing a sealed cell according to the 7th aspect, the protrusion for welding comprises a connecting portion that is connected to the flange, and an end portion that is widened out from the connecting portion towards the center of the cap, and a length of the connecting portion in a circumferential direction of the cap case is made to be shorter than a length of the end portion in the circumferential direction.

Advantageous Effect of the Invention

According to the sealed cell of this invention and the method of manufacture thereof, it is possible to reduce the electrical resistance while still ensuring good sealing performance for the sealing lid.

DESCRIPTION OF THE EMBODIMENTS

The present invention provides a structure that aims at reduction of the value of the resistance of a sealing lid that seals the opening of a cell container, and, in the following, with reference to the drawings, the sealed cell of this invention will be explained in terms of various embodiments in which it is applied to a cylindrical type lithium ion secondary cell.

—Embodiment #1—
—The Structure of a Sealed Cell—

Figure 1:
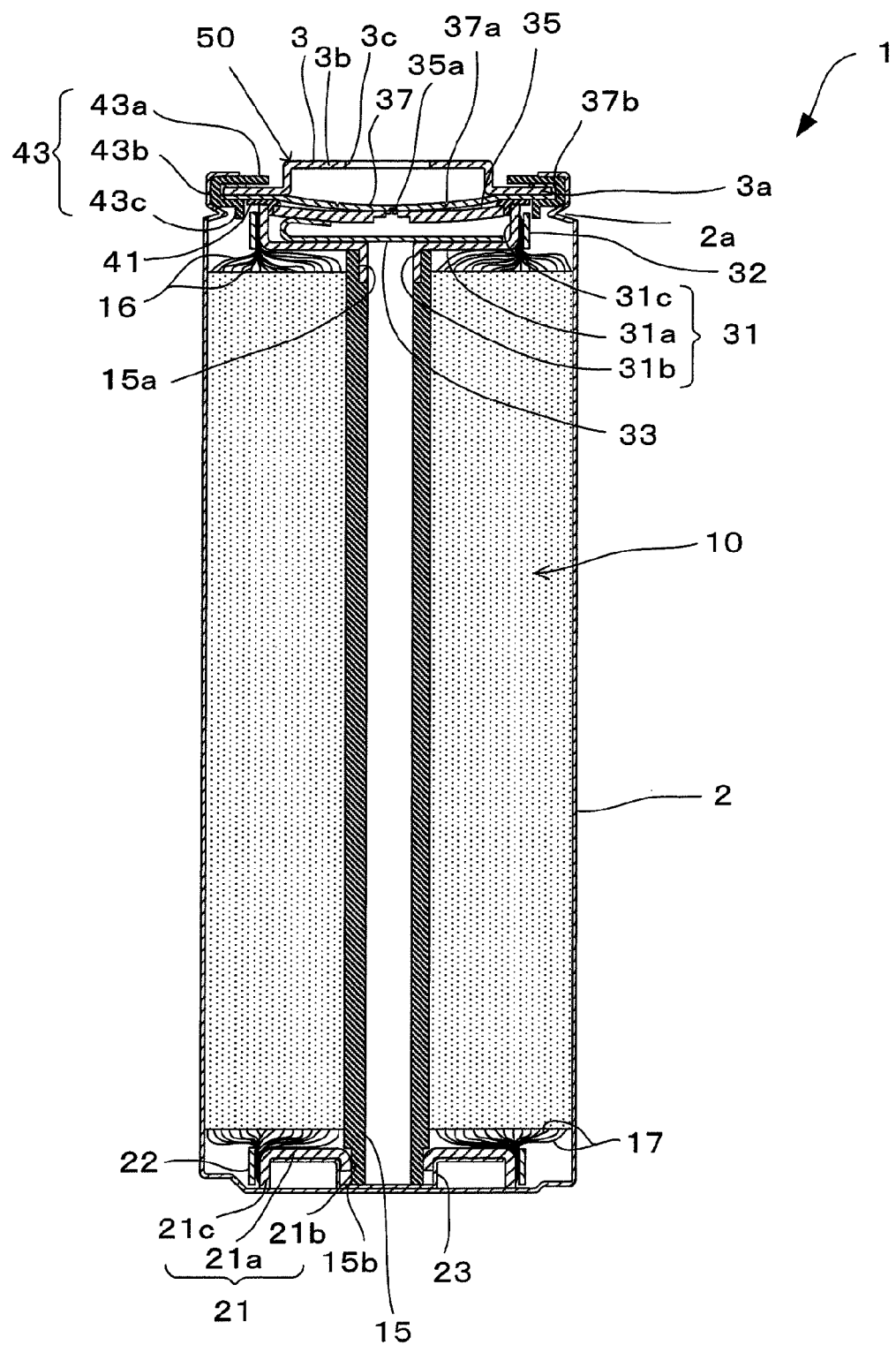
FIG. 1 is a sectional view showing a first embodiment of the sealed cell of this invention.
Figure 2:
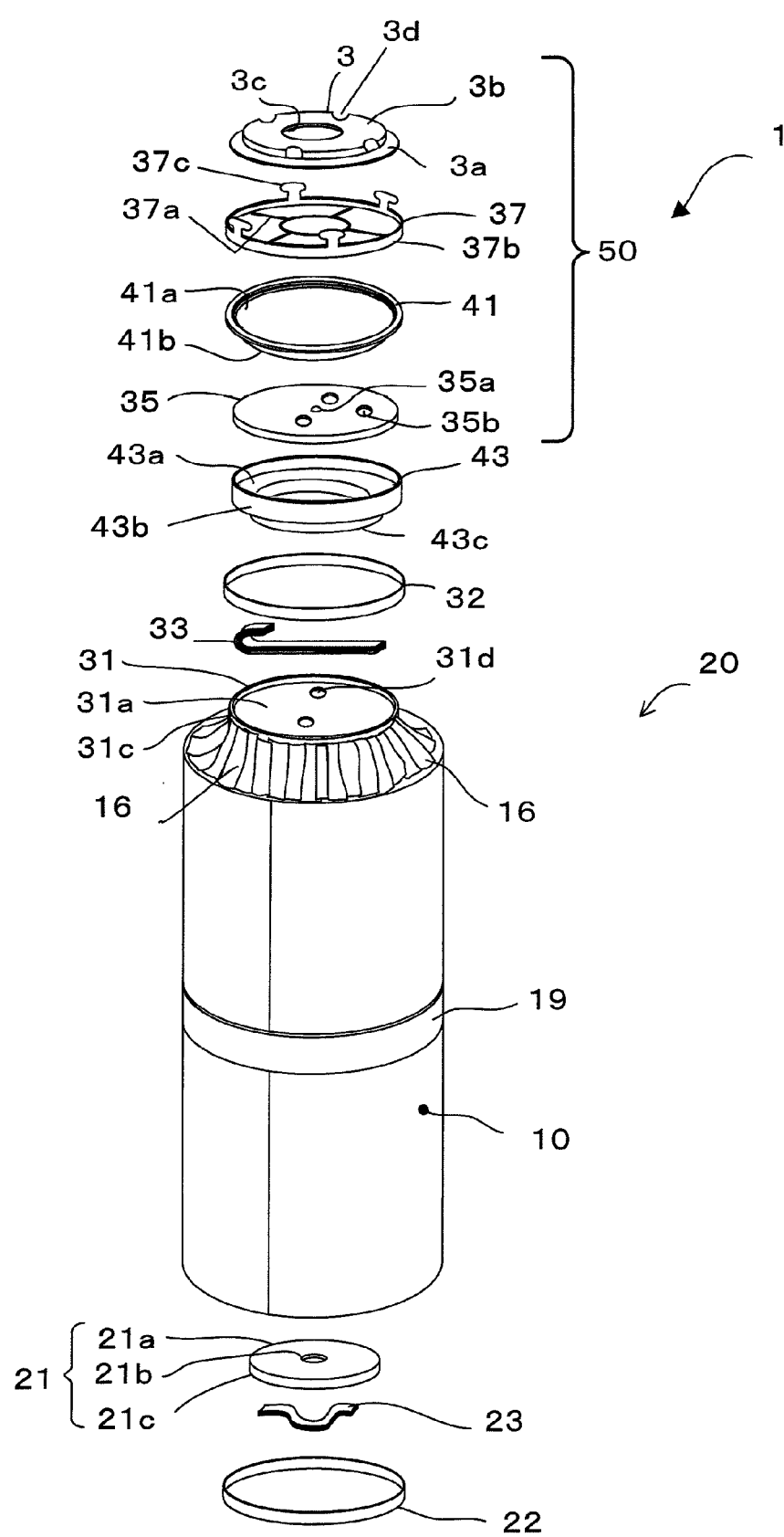
FIG. 2 is an exploded perspective view of the sealed cell shown in FIG. 1.

FIG. 1 is a vertical sectional view showing a first embodiment of the sealed cell of this invention, and FIG. 2 is an exploded view of the sealed cell shown in FIG. 1.

This sealed cell 1 may, for example, have the external dimensions of 40 mm diameter and 110 mm height. In this cylindrical type secondary cell 1, a generating unit 20 that will be explained below is contained in the interior of a cylindrical cell container 2 with a bottom and whose opening portion is sealed with a sealing lid 50.

First, the generating unit 20 will be explained, and then the sealing lid 50 will be explained.

—The Cell Container 2—

At the upper end portion of the cylindrical cell container 2 with a bottom, which is its open end, a groove 2a is formed so as to project towards the interior of the cell container 2.

—The Generating Unit 20—

Figure 3:
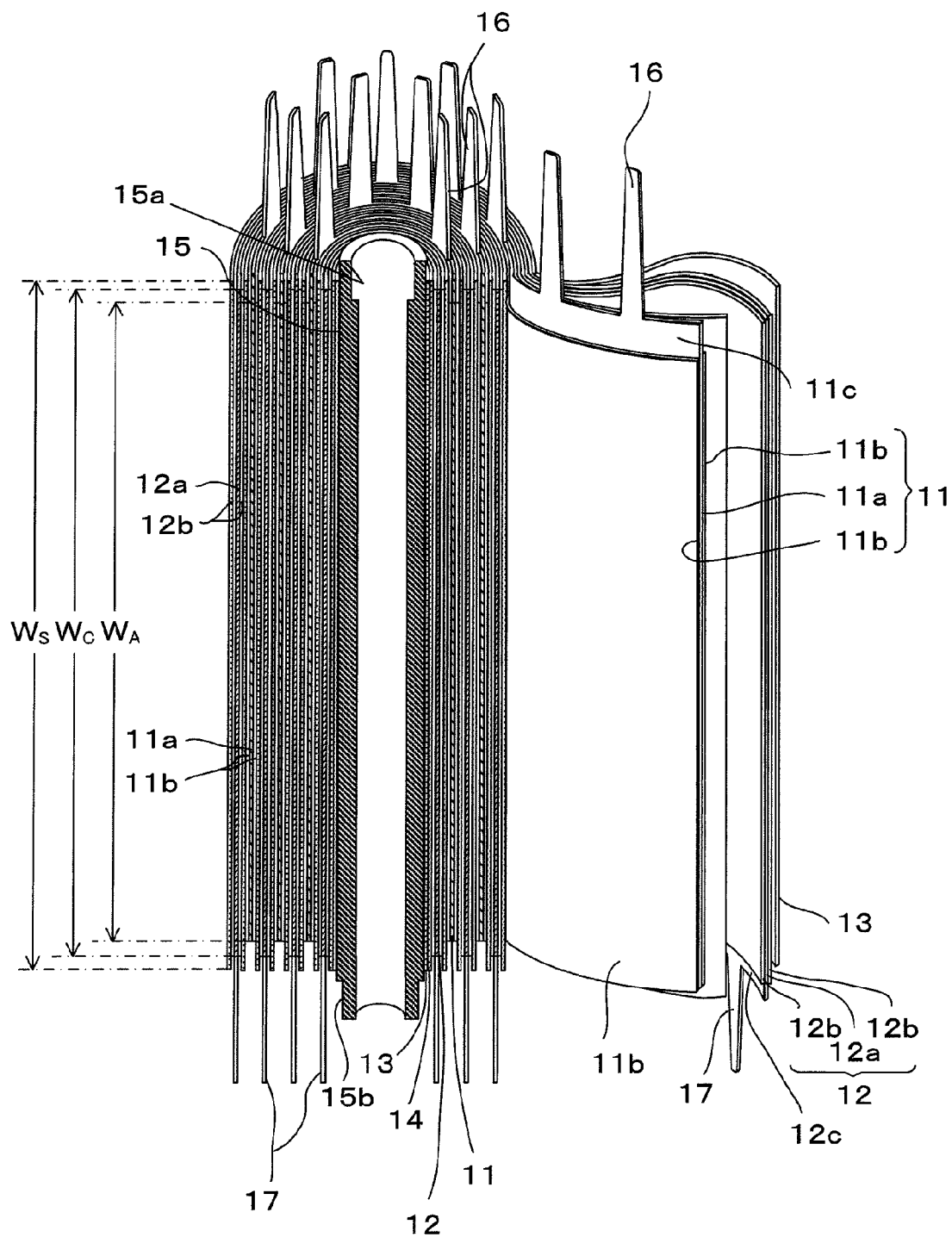
FIG. 3 is a partly cut away perspective view, for showing the details of an electrode group of FIG. 1.
Figure 4:
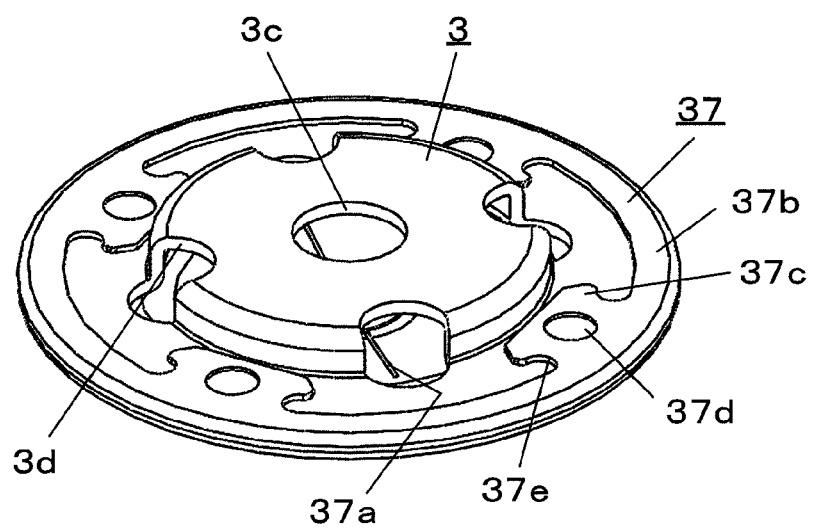
FIG. 4 is a perspective view of the sealing lid of FIG. 1.
Figure 5:
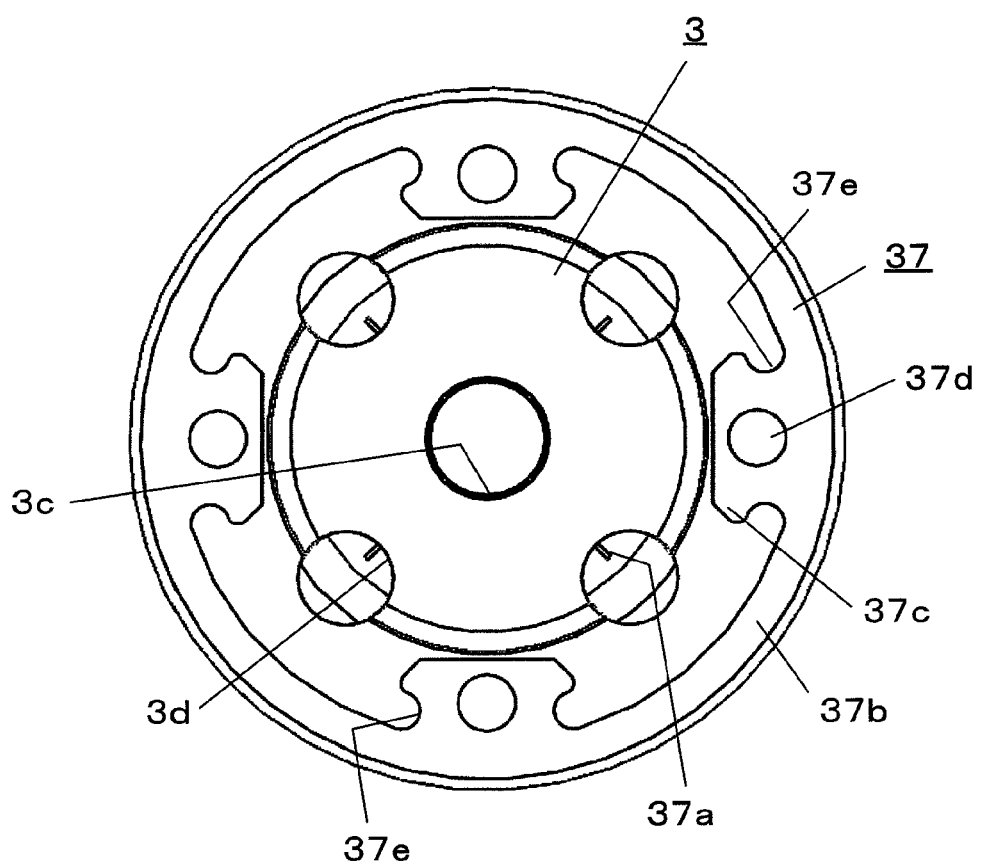
FIG. 5 is a plan view of the sealing lid of FIG. 4.

As will be explained hereinafter, the generating unit 20 is built as an integral unit, and comprises an electrode group 10, a positive electrode current collecting member 31, and a negative electrode current collecting member 21. The electrode group 10 has an axial core 15 at its central portion, and a positive electrode, a negative electrode, and separators are wound around this axial core 15. FIG. 3 shows the detailed structure of the electrode group 10, and is a perspective view thereof in the state with a portion cut away. As shown in FIG. 3, the electrode group 10 comprises a positive electrode 11, a negative electrode 12, and first and second separators 13 and 14, all wound upon the external surface of the axial core 15.

In this electrode group 10, the innermost turn of the first separator 13 is wound around the external surface of the axial core 15, and the negative electrode 12, the second separator 14, and the positive electrode 11 are wound outside this first separator 13, layered together in that order. One or more turns of the first separator 13 and the second separator 14 are wound inside the innermost turn of the negative electrode 12 (in FIG. 3, one turn). Moreover, the negative electrode 12 and the first separator 13 are wound as the outermost turn. This outermost turn of the first separator 13 is held down with adhesive tape 19 (refer to FIG. 2).

The positive electrode 11 is made from aluminum foil in an elongated shape, and includes a positive electrode sheet 11a and a processed positive electrode portion which is formed by applying a positive electrode mixture 11b to both sides of this positive electrode sheet 11a. A positive electrode portion 11c untreated with mixture where the positive electrode mixture 11b is not applied and the aluminum foil is exposed appears along the upper edge of the positive electrode sheet 11a in its longitudinal direction. A large number of positive leads 16 are formed integrally with this untreated positive electrode portion 11c at regular intervals along it, and project upwards parallel to the axial core 15.

The positive electrode mixture 11b consists of a positive electrode active material, a positive electrode conductive material, and a positive electrode binder. The positive electrode active material is desirably lithium oxide. As examples, lithium cobalt oxide, lithium manganese oxide, lithium nickel oxide, or lithium composite oxide (a lithium oxide including two or more selected from cobalt, nickel, and manganese) or the like may be suggested. The positive electrode conductive material is not particularly limited, provided that it is a substance that can assist transmission to the positive electrode of electrons generated by an occlusion reaction of the lithium in the positive electrode mixture. Examples that may be suggested for the positive electrode conductive material are graphite, acetylene black, or the like.

The positive electrode binder is not particularly limited, provided that it is capable of binding together the positive electrode active material and the positive electrode conductive material and also is capable of binding together the positive electrode mixture and the positive current collecting member, and provided that it is not greatly deteriorated by contact with the non-aqueous electrolyte. As examples of the positive electrode binder, polyvinylidene fluoride (PVDF) or fluorine rubber or the like may be suggested. The method of forming the positive electrode mixture layer is not particularly limited, provided that it is a method that can form the positive electrode mixture upon the positive electrode. As an example of a method for applying the positive electrode mixture 11b, there may be suggested the method of applying a solution upon the positive electrode sheet 11a, in which the structural substance of the positive electrode mixture 11b is dispersed.

As methods for applying the positive electrode mixture 11b to the positive electrode sheet 11a, for example, a roll painting method or a slit dye painting method or the like may be suggested. N-methyl-pyrrolidone (NMP) or water or the like may be added as a solvent for the solution in which the positive electrode mixture 11b is dispersed, the mixture may be kneaded into a slurry and the slurry may be applied uniformly to both sides of a piece of aluminum foil of thickness 20 μm, and, after drying, this may be pressed and cut to shape. The thickness at which the positive electrode mixture 11b is applied may be, for example, about 40 μm on each side. While the positive electrode sheet 11a is being cut to shape, the positive leads 16 are also formed integrally therewith.

The negative electrode 12 is made from copper foil in an elongated shape, and a processed negative electrode unit is formed by applying a negative electrode mixture 12b to both sides of this negative electrode sheet 12a. A negative electrode portion 12c untreated with mixture where the negative electrode mixture 12b is not applied and the copper foil is exposed appears along the lower edge of the negative electrode sheet 12a in its longitudinal direction. A large number of negative leads 17 are formed integrally with this untreated negative electrode portion 12c at regular intervals along it, and project downwards in the opposite direction to the positive leads 16.

The negative electrode mixture 12b consists of a negative electrode active material, a negative electrode binder, and a thickener. It would also be acceptable for the negative electrode mixture 12b to include a negative electrode conductive material such as acetylene black or the like. It is desirable to use graphitic carbon as the negative electrode active material. By using graphitic carbon, it is possible to manufacture a lithium ion secondary cell aimed at a plug in type hybrid automobile or an electric automobile, for which high capacity is required. The method of forming the negative electrode mixture 12b is not particularly limited, provided that it is a method by which the negative electrode mixture 12b can be formed upon the negative electrode sheet 12a. As an example of a method for applying the negative electrode mixture 12b upon the negative electrode sheet 12a, there may be suggested the method of applying a solution upon the negative electrode sheet 12a, in which the structural substance of the negative electrode mixture 12b is dispersed. As methods for application, for example, a roll painting method or a slit dye painting method or the like may be suggested.

As one method for applying the negative electrode mixture 12b to the negative electrode sheet 12a, for example, N-methyl-2-pyrrolidone or water or the like may be added as a solvent for the dispersed solution of the negative electrode mixture 12b, the mixture may be kneaded into a slurry and the slurry may be applied uniformly to both sides of a piece of copper foil of thickness 10 µm, and, after drying, this may be pressed and then cut to shape. The thickness at which the negative electrode mixture 12b is applied may be, for example, about 40 µm on each side. When the negative electrode sheet 12a is being cut to shape, the negative leads 17 are also formed integrally therewith.

If the widths of the first separator 13 and the second separator 14 are termed WS, the width of the negative electrode mixture 12b that is formed upon the negative electrode sheet 12a is termed WC, and the width of the positive electrode mixture 11b that is formed upon the positive electrode sheet 11a is termed WA, then it is arranged for the equation below to be satisfied:

$$WS > WS > Wa \text{ (refer to FIG. 3)}$$

In other words, the width WC of the negative electrode mixture 12b is always greater than the width WA of the positive electrode mixture 11b. This is because, in the case of a lithium ion secondary cell, while the lithium that is the positive electrode active material is ionized and infiltrates into the separator, if the negative electrode active material is not formed upon the negative electrode side so that the negative electrode sheet 12b is exposed, then the lithium will be deposited upon the negative electrode sheet 12a, and this can become a cause for the occurrence of internal short circuiting.

Referring to FIGS. 1 and 3, a groove 15a of larger internal diameter is formed around the inner surface of the upper end portion in the axial direction (the vertical direction in the figures) of the hollow cylindrical axial core 15, and the positive electrode current collecting member 31 is pressed into this groove 15a. This positive electrode current collecting member 31 may, for example, be made from aluminum, and comprises a base portion 31a that is formed as a circular disk, a lower barrel portion 31b that projects at the inner peripheral portion of this base portion 31a towards the axial core 15 and that is pressed into the inner surface of the axial core 15, and an upper barrel portion 31c that projects at the outer peripheral edge towards the sealing lid 50. Opening portions 31d for venting gas generated in the interior of the cell are formed in the base portion 31a of the positive electrode current collecting member 31.

All of the positive leads 16 of the positive electrode sheet 11a are welded to the upper barrel portion 31 of the positive electrode current collecting member 31. In this case, as shown in FIG. 2, the positive leads 16 are laid over the upper barrel portion 31c of the positive electrode current collecting member 31, and are joined thereto. Since each of these positive leads 16 is very thin, accordingly it is not capable of handling a high electrical current. Due to this, the large number of positive leads 16 are formed at predetermined intervals over the entire length, from the start of winding upon the axial core 15 to the end of winding.

The positive leads 16 of the positive electrode sheet 11a and an annular pressure member 32 are welded to the external periphery of the upper barrel portion 31c of the positive electrode current collecting member 31. The large number of positive leads 16 are laid over one another upon the external periphery of the upper barrel portion 31c of the positive electrode current collecting member 31, the pressure member 32 is temporarily fixed over the external circumference of these positive leads 16 by being pressed onto them, and the assembly is welded in this state.

Since the positive electrode current collecting member 31 is oxidized by the electrolyte, accordingly it is possible to enhance its reliability by making it from aluminum. When the surface of aluminum is exposed by any process, immediately a surface film of aluminum oxide forms upon this surface, and further oxidization by the electrolyte can be prevented by this surface film of aluminum oxide.

Moreover, by making the positive electrode current collecting member 31 from aluminum, it becomes possible to weld the positive leads 16 of the positive electrode sheet 11a by ultrasound welding or spot welding or the like.

A step portion 15b of smaller external diameter is formed around the outer surface of the lower end portion of the axial core 15, and the negative electrode current collecting member 21 is pressed over this step portion 15b and fixed thereto. This negative electrode current collecting member 21 may, for example, be made from copper, and has a base portion 21a formed with an opening portion 21b that is pressed over the step portion 15b of the axial core 15, and with an external peripheral barrel portion 21c at its outer peripheral edge that projects towards the bottom portion of the cell container 2.

All of the negative leads 17 of the negative electrode sheet 12a are welded by ultrasound welding or the like to the external peripheral barrel portion 21c of the negative electrode current collecting member 21. Since each of these negative leads 17 is very thin and is not capable of handling a high electrical current, accordingly a large number thereof are formed at predetermined intervals over the entire length, from the start of winding upon the axial core 15 to the end of winding.

The negative leads 17 of the negative electrode sheet 12a and the annular pressure member 22 are welded to the external periphery of the external peripheral barrel portion 21c of the negative electrode current collecting member 21. The large number of negative leads 17 are held closely contacted against the external periphery of the external peripheral barrel portion 21c of the negative electrode current collecting member 21, the pressure member 22 is temporarily pressed over and fixed to the outer periphery of the negative leads 17, and the assembly is welded in this state.

A negative electrode conducting lead 23 that is made from copper is welded to the lower surface of the negative electrode current collecting member 21. This negative electrode conducting lead 32 is also welded to the cell container 2 at the bottom portion of the cell container 2. The cell container 2 may, for example, be made from carbon steel of 0.5 mm thickness, with its surface being nickel plated. By using this type of material, it is possible to weld the negative electrode conducting lead 23 to the cell container 2 by resistance welding or the like.

The one end portion of a flexible positive electrode conducting lead 33 that is made from a plurality of pieces of aluminum foil laminated together is joined by welding to the upper surface of the base portion 31a of the positive electrode current collecting member 31. By laminating a plurality of layers of aluminum foil together and integrating them together to form the positive electrode conducting lead 33, this lead 33 is enabled to conduct a high electrical current, and moreover it is endowed with flexibility. In other words, while it is necessary to increase the thickness of the connecting member in order for a high electrical current to be able to flow, if it were to be made as a single metallic plate member, then its rigidity would be high, and it would lose its flexibility. Thus, this lead is endowed with flexibility by laminating together a large number of pieces of aluminum foil whose individual thicknesses are small. The thickness of the positive electrode conducting lead 33 may, for example, be 0.5 mm, and it may be made from 5 pieces of aluminum foil each of thickness 0.1 mm.

As has been explained above, by the large number of positive leads 16 being welded to the positive electrode current collecting member 31, and by the large number of negative leads 17 being welded to the negative electrode current collecting member 21, the positive electrode current collecting member 31, the negative electrode current collecting member 21, and the electrode group 10 are integrated together to constitute the generating unit 20 (refer to FIG. 2). However in FIG. 2, for the sake of convenience of illustration, the negative electrode current collecting member 21, the pressure member 22, and the negative electrode conducting leads 23 are shown as separated from the generating unit 20.

—The Sealing Lid 50—

The sealing lid 50 will now be explained in detail with reference to FIGS. 1, 2, and 4 through 6.

The sealing lid 50 comprises a cap 3 having exhaust apertures 3c and 3d, a cap case 37 installed in the cap 3 and having cleavage grooves 37a, a positive electrode connection plate 35 that is spot welded to the central portion of the rear surface of the cap case 37, and an insulation ring 41 that is sandwiched between the edge of the upper surface of the positive electrode connection plate 35 and the rear surface of the cap case 37 and is assembled in advance as a sub-assembly.

The cap 3 is made from a ferrous material such as carbon steel or the like, and is nickel plated. The cap 3 has a peripheral portion 3a that is shaped as a circular disk and a barrel portion 3b that projects upwards from this peripheral portion 3a and has a top but no bottom, so that overall shape of the cap 3 is like a hat. An opening portion 3c is formed in the center of the barrel portion 3b, and opening portions 3d are formed by being drilled through its side in a plurality of directions (for example in four directions spaced apart around its center by 90°). The barrel portion 3b functions as an external positive terminal, and a bus bar or the like is connected thereto.

The edge portion of the cap 3 is integrated with the crimped back flange 37b of the cap case 37 that is made from aluminum alloy. That is to say, the border of the cap case 37 being crimped back along the upper surface of the cap 3, and the cap 3 is fixed by swaging. Four protrusions for welding 37c are provided at intervals of 90° to the circular ring that is crimped back over the upper surface of the cap 3, in other words to the flange 37b, and these protrusions 37c project from the inner peripheral edge of the ring towards the center of the cap 3. The cap 3 and these four protrusions 37c are welded together by friction stir welding. In other words, the cap case 37 and the cap 3 are swaged and fixed together at the flange 37b, and are then integrated together by welding at the protrusions 37c.

A cleavage groove 37a is formed in a circular shape at the central circular region of the cap case 37, and further cleavage grooves 37a are formed to extend radially in four directions from this circular cleavage groove 37a. Each of these cleavage grooves 37a is made by the upper surface of the cap case 37 being pressed and squashed into a letter-V shape, so that the portion that remains is thin. These cleavage grooves 37a rupture when the internal pressure within the cell container 2 rises above a predetermined value, so that gas in the interior of the cell is vented.

Figure 6:
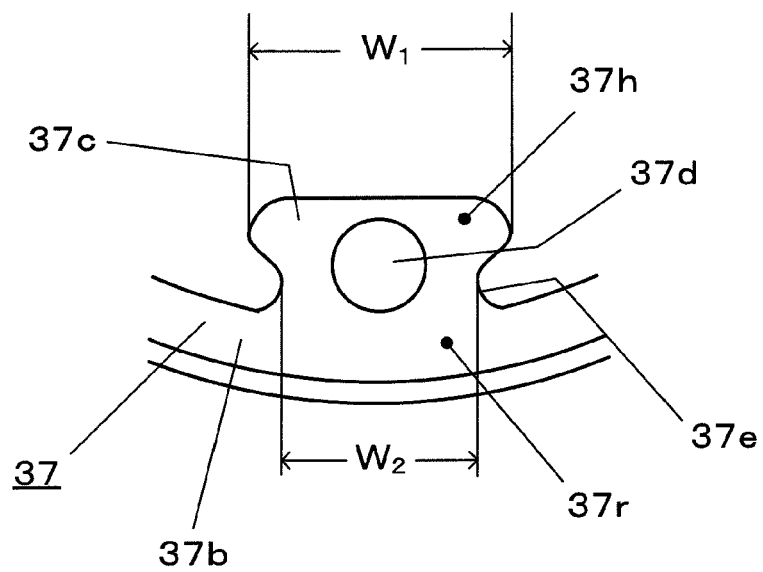
FIG. 6 is a plan view showing a protrusion of a flange portion of a cap case of FIG. 4.

As shown in FIG. 6, each of the protrusions 37c is formed approximately in a letter-T shape that is symmetric left and right, having a portion 37r that connects to the flange 37b and a widened portion 37h that is linked to that connecting portion 37r. If the width in the circumferential direction of the widened portion 37h (i.e. of the end portion) is termed W1 and the width in the circumferential direction of the connecting portion 37r is termed W2, then W1>W2. The connecting portion 37r of width W2 may, for example, be formed by making approximately semicircular shaped notches 37e in the portion of the protrusion 37c that connects it to the flange 37b. A circular region 37d almost at the central portion of the widened portion 37h is a portion for friction stir welding.

In this embodiment, the nickel plated layer of the cap 3 and the protrusions 37c of the cap case 37 that are made from aluminum alloy are joined together by friction stir welding. By forming this junction by welding, the electrical resistance between the cap 3 and the cap case 37 becomes sufficiently low. Moreover, by projecting the protrusions for welding 37c from the flange 37b, it is arranged to have a sufficiently broad area for welding. It is possible to reduce the electrical resistance by employing this type of structure, as compared to the case in which the cap case 37 is installed to the cap 3 only by swage processing.

In other words, with the present invention, it is possible to reduce the resistance value on the current path between the cap 3 and the cap case 37 by welding the cap 3 and the protrusions 37c of the cap case 37 together.

It should be understood that, if the cap 3 is made from a ferrous material, then, when connecting this cell in series with another cylindrical type secondary cell that is also made from a ferrous material, it is possible to join this cell to that other cylindrical type secondary cell by spot welding.

This sealing lid 50 constitutes an anti-explosion mechanism. When, due to gas evolved in the interior of the cell container 2, the internal pressure rises above a standard value, then cracking of the cap case 37 takes place at the cleavage grooves, and the internal gas is discharged from the exhaust apertures 3c and 3d of the cap 3, so that the pressure within the cell container 2 is reduced. Moreover, due to the internal pressure within the cell container 2, the cap case 37 bulges to the outwards of the container, so that its electrical connection with the positive electrode connection plate 37 is ruptured, and excessive current is suppressed.

The sealing lid 50 is mounted over the upper barrel portion 31c of the positive electrode current collecting member 31 in an insulated state. In other words, the cap case 37 that has been integrated with the cap 3 is mounted to the upper end surface of the positive electrode current collecting member 31 in a state of being insulated via the insulation ring 41. However, the cap case 37 is electrically connected to the positive electrode current collecting member 31 by the positive electrode conducting lead 33, so that the cap 3 of the sealing lid 50 constitutes a positive electrode for this cell 1. Here, the insulation ring 41 has an opening portion 41a (refer to FIG. 2) and a side portion 41 that projects downward. The connection plate 35 is fitted into this opening portion 41*a* of the insulating material 41.

The connection plate 35 is made from aluminum alloy and is almost uniform overall except for its central portion, and moreover its central portion is curved somewhat downward so that it has an almost dish shape. The thickness of this connection plate 35 may, for example, be around 1 mm. A projecting portion 35*a* that is formed thinner in a dome shape is provided at the center of the connection plate 35, and a plurality of opening portions 35*b* are formed at the sides of this projecting portion 35*a* (refer to FIG. 2). These opening portions 35*b* have the function of allowing the escape of gas generated in the interior of the cell. The projecting portion 35*a* of the connection plate 35 is joined to the bottom surface of the central portion of the cap case 37 by resistance welding or by friction stir welding.

While this will be described in detail hereinafter, the electrode group 10 is loaded into the cell container 2, and the sealing lid 50, after having been manufactured in advance as a partial assembly, is mounted in the cylindrical upper portion thereof while being electrically connected by the positive electrode current collecting member 31 and the positive electrode conducting lead 33. And the external circumferential wall portion 43*b* of the gasket 43 is folded back by pressing or the like, and swage processing is performed and the sealing lid 50 is pressed into contact along the axial direction by the base portion 43*a* and the external circumferential wall portion 43*b*. By doing this, the sealing lid 50 is fixed to the cell container 2 via the gasket 43.

Initially, as shown in FIG. 2, the gasket 43 has a shape that includes an annular base portion 43*a*, an external circumferential wall portion 43*b* that is formed to rise almost vertically upwards at the outer circumferential edge of the base portion 43*a*, and a barrel portion 43*c* that is shaped to droop almost vertically downwards from the internal periphery of the base portion 43*a*. By the cell container 2 being swaged, the cap case 37 is sandwiched by the external wall portion 43*b*.

A predetermined amount of a non-aqueous electrolyte is injected into the interior of the cell container 2. One desirable possibility that can be used for this non-aqueous electrolyte is a lithium salt dissolved in a carbonate type solvent. Examples of lithium salts that may be suggested are lithium hexafluorophosphate (LiPF6) or lithium tetrafluoroborate (LiBF4) or the like. Moreover, examples of carbonate type solvents that may be suggested are ethylene carbonate (EC), dimethyl carbonate (DMC), propylene carbonate (PC), methyl-ethyl carbonate (MEC), or mixtures of one or more solvents selected from the above.

The sealed cell of this embodiment provides the following beneficial operational effects.

(1) Since the protrusions 37*c* are provided so as to be protruded from the flange 37*b* of the cap case 37, and these protruding portions 37*c* are welded to the cap 3, accordingly it is possible to ensure a broader welding area than in the prior art, and it is thus possible to lower the resistance value of the electrical current path provided by the sealing lid 50.

(2) It is arranged to provide the widened portions 37*h* having sufficiently large areas at the ends of the protrusions 37*c*, and to link these widened portions 37*h* to the flange 37*b* via the connecting portions 37*r* that are narrower in the circumferential direction. These connecting portions 37*r* are elements whose rigidity against plastic deformation is made to be low, and, due to this, when the flange 37*b* and the protrusions 37*c* are folded and bent back along the upper surface of the cap 3, deformation and other defects of the flange 37*b* do not occur. Accordingly, it is possible to avoid the problem of reduction of the sealing performance of the sealing lid, and the like.

Further explanation will now be provided of the beneficial operational effects conferred by the lithium secondary cell 1 of this embodiment.

With the lithium secondary cell 1 of this embodiment, friction stir welding is performed on the protrusions 37*c* that project from the flange 37*b* (i.e. from the swaged portion) by which the cap case 37 and the cap 3 are swaged together. During this friction stir welding, by contacting and pressing the end portion of a rotating tool against the protrusions 37*c* while rotating the tool, the portions of the cap case 37 that consist of the protrusions 37*c* and portions of the upper surface of the cap 3 are caused to flow plastically and to melt together due to the frictional heat, thus being integrated together. Since, due to this, the contact surfaces between the different metals of the cap case 37 and the cap 3 are eliminated at the unified junction portions, accordingly it is possible to reduce the electrical resistance between the cap case 37 and the cap 3 during conduction of electricity.

Furthermore, with this embodiment, this joining by friction stir welding is performed at the four spots where the protrusions 37*c* are located. Moreover, since the size of the protrusions 37*c* provides the connection area, it is best for them to be as large as possible, and the connecting portions 37*r* that are provided neck down the attachment bases of the protrusions 37*c* in order to reduce malfunctions during swaging. Due to this, it is possible to ensure that the welded portions are large, so that it is possible to alleviate loss of electrical power during high current discharge, since increase of the electrical resistance is suppressed even during high current discharge.

Furthermore, with the lithium secondary cell 1 of this embodiment, the friction stir welding is performed by pressing a rotating tool into contact with the protrusions 37*c* that project from the flange 37*b* of the cap case 37 that is crimped (turned back) over the cap 3. Due to this, the formation during welding of pin holes and the like on the lower surface of the cap case 37 that is positioned in the interior of the battery after the assembly of the cell is prevented. And since with this lithium secondary cell 1, because of this fact, the non-aqueous electrolyte does not come into contact with the cap 3 so that corrosion of the cap 3 is prevented, accordingly it is possible to prevent leakage of the non-aqueous electrolyte, and it is possible to suppress damage to surrounding equipment. Thus the lithium secondary cell 1 of this embodiment, with which loss of electrical power during high current discharge is prevented, and with which leakage of the non-aqueous electrolyte is prevented, is a cell that enhances the reliability of the junction between the cap case 37 and the cap 3 of the sealing lid 50.

Moreover since the material used for the positive electrode connection plate 35 of the cap case 37 has a lower melting point than the material of the cap 3 with the lithium secondary cell 1 of this embodiment, accordingly it is possible simply and easily to join together the positive electrode connection plate 35 of the cap case 37 and the positive electrode conducting lead 33 by welding. Further, since the cap 3 has a higher melting point than the cap case 37, accordingly it is possible to suppress deformation and so on during usage of the cell at an elevated temperature or in a high temperature environment.

With a prior art lithium secondary cell, spot welding is employed for joining the lid case (i.e. the cap case) and the lid cap (i.e. the cap) that make up the sealing lid. Since the welding electrode is contacted against the lower surface of the flange portion of the lid case and the upper surface of the flange portion of the lid cap with spot welding, and current is flowed through the electrode, accordingly sometimes it may happen that defects such as pin holes or the like appear in the lower surface of the lid case that is made from aluminum and that has a lower melting point than the lid cap that is made from ferrous material, or that welding marks remain. Since it is difficult for pin holes or the like to be formed in the lid cap that is made from ferrous material even if pin holes or the like are formed in the lid case that is made from aluminum, accordingly it is not possible to detect these pin holes in the lid case even if airtightness testing of the cell is performed. Since the lower surface of the lid case is located in the interior of the cell after the cell has been assembled, accordingly the non-aqueous electrolyte can get into the pin holes because of the lower surface of the lid case contacting the non-aqueous electrolyte. Since, because of this, the non-aqueous electrolyte that has penetrated into the pin holes comes into contact with the lid cap that is made from iron, accordingly the lid cap corrodes, and the non-aqueous electrolyte is able to leak out. There is a fear that such non-aqueous electrolyte that has leaked out to the exterior of the cell may not only cause damage such as corrosion or the like to this cell, but also to neighboring cells if this cell is part of an assembled battery, or to surrounding equipment or the like. On the other hand, since the metallic material of the lid case and of the cap are different, accordingly the sealing lid presents a contact resistance due to the presence of these different types of metals. Because of this, loss of electrical power occurs during high current discharge. With an assembled battery in which a large number of cells are connected together, the overall resistance becomes quite great, and the loss of power also becomes great. This embodiment provides a lithium secondary cell for high current discharge that is capable of solving these problems.

—A Method of Manufacturing this Sealed Cell—

When this sealed cell is to be manufactured, first, the positive electrode 11 is manufactured by forming the positive electrode mixture 11b and the positive electrode mixture untreated portion 11c on both sides of the positive electrode sheet 11a, and by also forming the large number of positive leads 16 integrally with the positive electrode sheet 11a. Moreover, the negative electrode 12 is manufactured by forming the negative electrode mixture 12b and the negative electrode processed portion 12c on both sides of the negative electrode sheet 12a, and by also forming the large number of negative leads 17 integrally with the negative electrode sheet 12a.

And, as shown in FIG. 3, the electrode group 10 is manufactured by winding the first separator 13, the positive electrode 11, the second separator 14, and the negative electrode 12 in that order upon the axial core 15. In this case, if the innermost edge portions of the first separator 13, the positive electrode 11, the second separator 14, and the negative electrode 12 are welded to the axial core 15, then it becomes simple and easy to perform the winding while resisting the load imposed during the winding.

The negative electrode current collecting member 21 is attached to the lower portion of the axial core 15 of this electrode group 10. This attachment of the negative electrode current collecting member 21 is performed by fitting the opening portion 21b of the negative electrode current collecting member 21 over the step portion 15b that is provided at the lower end portion of the axial core 15. Next, the negative leads 17 are distributed almost equally over the entire external periphery of the external peripheral barrel portion 21c of the negative electrode current collecting member 21 and are closely contacted thereagainst, and the pressure member 22 is fitted over the external periphery of these negative leads 17. And the negative leads 17 and the pressure ring 22 are then welded to the negative electrode current collecting member 21 by ultrasound welding or the like. Next, the negative electrode conducting lead 23 is welded to the negative electrode current collecting member 21, so as to straddle the lower end surface of the axial core 15 and the negative electrode current collecting member 21.

Next, the lower barrel portion 31b of the positive electrode current collecting member 31 of the axial core 15 is fitted into the groove 15a that is provided at the upper end of the axial core 15. And the positive leads 16 of the positive electrode 11 are closely contacted against the outer surface of the upper barrel portion 31c of the positive electrode current collecting member 31. Then the pressure member 32 is fitted over the external periphery of the positive leads 16, and the positive leads 16 and the pressure ring 32 are welded to the upper barrel portion 31c of the positive electrode current collecting member 31 by ultrasound welding or the like. The generating unit 20 is constructed in this manner.

Next, the generating unit 20 that has been manufactured according to the process described above is housed in a cylindrical metallic vessel with a bottom, which has an appropriate size for containing the generating unit 20. This cylindrical member having a bottom constitutes the cell container 2. In the following, in the interests of clarity of explanation, this cylindrical member having a bottom will be explained as being the cell container 2.

Then the negative electrode conducting lead 22 of the generating unit 20 that has thus been housed in the cell container 2 is welded to the cell container 2 by resistance welding or the like. In this case, although this procedure is not shown in the figures, an electrode rod is inserted into the hollow axis of the axial core 15 from the exterior of the cell container 2, and this electrode rod presses the negative electrode conducting lead 22 against the bottom portion of the cell container 2 and welds it thereto.

Next, a portion of the cell container 2 at its upper end portion is subjected to squeezing processing and is driven inwards, so that the almost letter-V shaped groove 2a is formed upon its outer surface. This groove 2a of the cell container 2 is formed so as to be positioned at the upper end portion of the generating unit 20, or, to put it in another manner, in the neighborhood of the upper end portion of the positive electrode current collecting member 31. Then a predetermined amount of the non-aqueous electrolyte is injected into the interior of the cell container 2, in which the generating unit 20 is held.

—Manufacturing the Cap Case 37—

The process of manufacture of the cap case 37 is shown in FIGS. 11 through 14.

The plurality of protrusions 37c are provided on the flange 37b of the cap case 37, and project upwards from the upper edge of the flange 37b in the state before swaging. When the flange 37b is swaged so as to lie along the upper surface of the cap 3, these protrusions 37c project along the upper surface of the cap 3 from the flange 37b towards the center of the cap 3. Then the cap case 37 is welded to the cap 3 by friction stir welding at the welded portions 37d at the approximate centers of the protrusions 37c.

Figure 12:
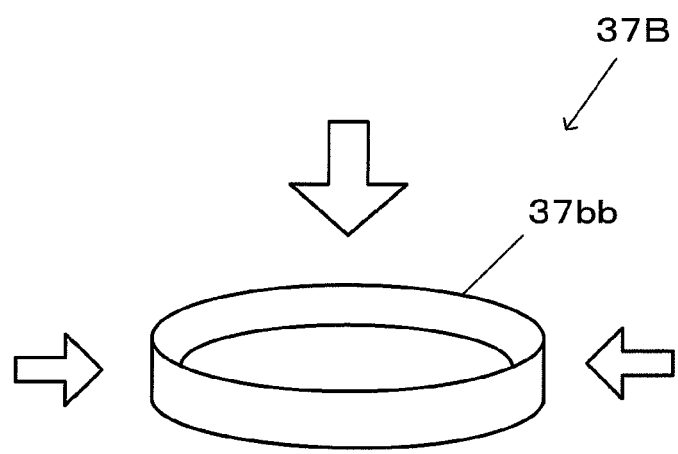
FIG. 12 is a perspective view showing a process in which the blank of FIG. 11 is squeezed.

As shown in FIG. 12, for forming the cap case 37, a piece of source material that is shaped as a circular plate (see FIG. 11) is processed by squeezing processing (the general concept of this processing is shown by the white arrows), so that the edge portion of this circular plate is pushed upward into a circular ring 37bb, and an intermediate workpiece 37B is formed.

Figure 13:
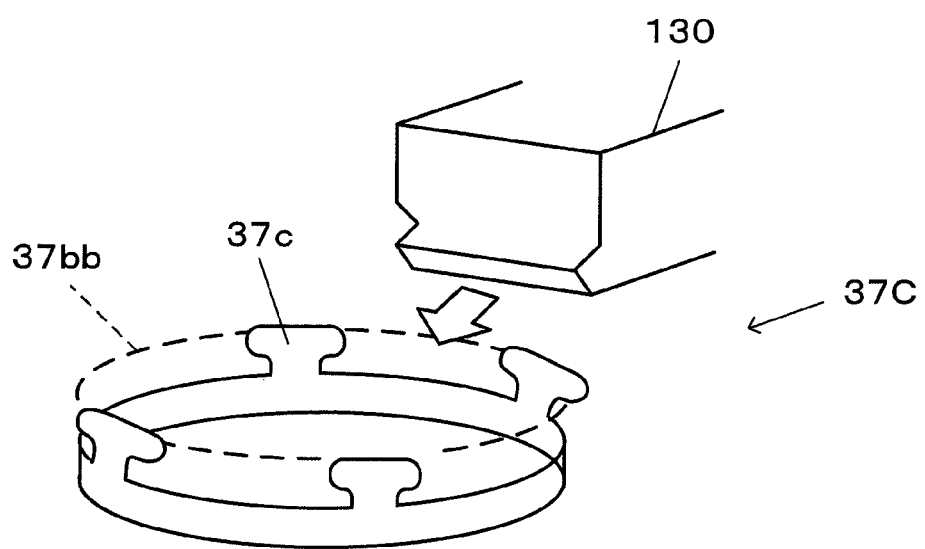
FIG. 13 is a perspective view showing a punching out process that is performed after the process of FIG. 12.

As shown in FIG. 13, the portions on the circular ring 37bb of this intermediate workpiece 37B between adjacent ones of the protrusions 37c, 37c are then punched out with, for example, a punching die 130.

Figure 14:
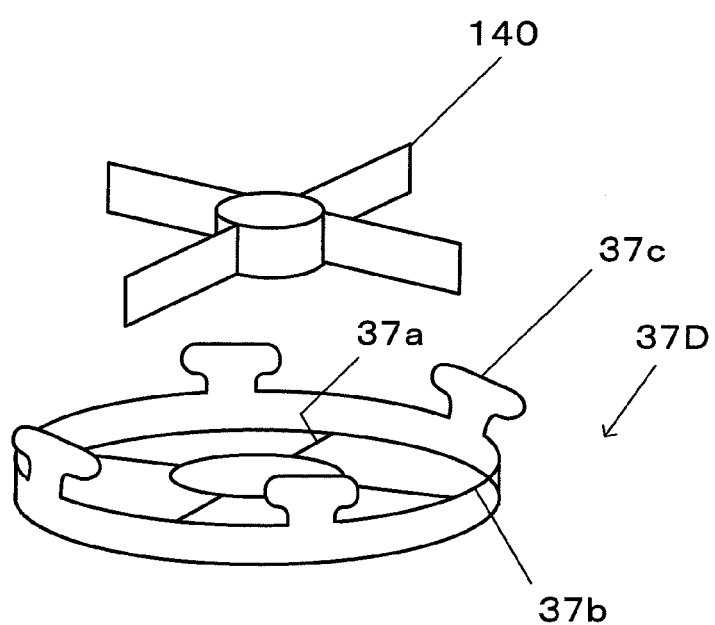
FIG. 14 is a perspective view showing a forming process that is performed after the process of FIG. 13.

Then as shown in FIG. 14, with for example a grooving die 140, the cleavage grooves 37a are incised into the intermediate workpiece 37D that has been manufactured by the punching out process of FIG. 13, and thus the cap case 37 is manufactured.

The cap 3 is then fixed to the cap case 37 that has been manufactured by the processes shown in FIGS. 11 through 14. This fixing together of the cap case 37 and the cap 3 is performed by swage processing and welding. As shown in FIG. 2, since initially the side wall 37b of the cap case 37 is formed so as to be orthogonal to its base portion, accordingly the peripheral portion 3a of the cap 3 is disposed within the side wall 37b of the cap case 37. And the side wall 37b of the cap case 37 is deformed by pressing or the like, and is pressed into contact with the upper and lower surfaces of the peripheral portion of the cap 3 and the external circumferential edge thereof, so as to cover them. Then the protrusions 37c are welded at the welded portions 37d.

Furthermore, the connection plate 35 is fitted into and attached in the opening portion 41a of the insulation ring 41. And the projecting portion 35a of the connection plate 35 is welded to the bottom surface of the cap case 37 to which the cap 3 is fixed. In this case, the welding method that is used may be resistance welding or friction stir welding. By welding together the connection plate 35 and the cap case 37, the insulation ring 41 into which the connection plate 35 is fitted and the cap 3 that is fixed to the connection plate 35 are integrated together with the connection plate 35 and the cap case 37, and thereby the integrated sealing lid 50 is constructed.

The one end portion of the positive electrode conducting lead 33 is welded to the base portion 31a of the positive electrode current collecting member 31, for example by ultrasound welding or the like. And the sealing lid 50 in which the cap 3, the cap case 37, the connection plate 35, and the insulation ring 41 are integrated together is arranged so as to be approached toward the other end portion of the positive electrode conducting lead 33. Then the other end portion of the positive electrode conducting lead 33 is welded to the lower surface of the connection plate 35 by laser welding. This welding is performed so that the junction surface at the other end portion of the positive electrode conducting lead 33 with the connection plate 35 becomes the same as the junction surface of the one end portion of the positive electrode conducting lead 33 that is welded to the positive electrode current collecting member 31.

The gasket 43 is received above the groove 2a of the cell container 2. As shown in FIG. 2, the gasket 43 has a structure such that, in this state, it has an external circumferential wall portion 43b that, upwards from the annular base portion 43a, is vertical with respect to the base portion 43a. With this construction, the gasket 43 is received in the interior of the upper portion of the groove 2 of the cell container 2. The gasket 43 is made from rubber, and, although this is not intended to be limitative, as one example of a suitable material, ethylene propylene copolymer (EPDM) may be suggested. Moreover, for example, the cell container 2 may be made from carbon steel having a thickness of 0.5 mm and its external diameter may be 40 mm, and the thickness of the gasket 43 may be around 1 mm.

The sealing lid 50 in which the cap 3, the cap case 37, the connection plate 35, and the insulation ring 41 are integrated together is arranged upon the barrel portion 43c of the gasket 43. In detail, the cap case 37 of the sealing lid 50 is mounted so that its peripheral portion is made to correspond to the barrel portion 43c of the gasket 43. In this case, it is arranged for the upper barrel portion 31c of the positive electrode current collecting member 31 to be fitted to the outer periphery of the flange 41b of the insulation ring 41.

In this state, the sealing lid 50 is fixed to the cell container 2 along with the gasket 43 by a so called swaging process. in which the portion of the cell container 2 between its groove 2a and its upper end surface is compressed by pressure. The positive electrode current collecting member 31 and the cap 3 are electrically conductively connected together via the positive electrode conducting lead 33, the connection plate 35, and the cap case 37, and thereby the cylindrical type secondary cell shown in FIG. 1 is manufactured.

—Example #1—

The sealed cell explained above is manufactured as follows.

Copper foil of thickness 10 gm was used for a negative electrode sheet 12a. A negative electrode mixture was spread on both sides of this copper foil, and contained carbon particles of average particle diameter 20 μm served as a negative electrode active material. For this negative electrode mixture, for example, 10 parts by weight of a binder (a binding substance) consisting of polyvinylidene fluoride (made by Kureha Chemical Industry Co., Ltd., product name: KF #1120) (hereinafter abbreviated as "PVDF") was combined with 90 parts by weight of carbon particles. When the negative electrode mixture was spread upon the copper foil, N-methyl-2-pyrrolidone (hereinafter abbreviated as "NMP") was used as a dispersion solvent. A portion where the negative electrode mixture was not applied was left along one edge of the copper foil in its lengthwise direction, for formation of the negative leads 17. After this negative electrode 12 was dried out, it was press processed and cut out to a width of 90 mm.

Aluminum foil of thickness 20 μm was used for a positive electrode sheet 11a. A positive electrode mixture was spread on both sides of this aluminum foil, and included lithium manganate particles of average particle diameter 10 μm served as a positive electrode active material. For this positive electrode mixture, for example, 10 parts by weight of carbon powder of average particle diameter of 3 μm and 5 parts per weight of a PVDF binder, which were served as a conductive material, were combined with 85 parts by weight of the lithium manganate particles. When the positive electrode mixture was spread upon the aluminum foil, NMP was used as a dispersion solvent. A portion where the positive electrode mixture was not applied was left along one edge of the aluminum foil in its lengthwise direction for formation of the positive leads 16, in a similar manner to the case with the negative electrode 12. After this positive electrode 11 was dried out, in a similar manner to the case with the negative electrode 12, it was press processed and cut out to a width of 88 mm.

Multi-hole polyethylene film of thickness 25 μm and width 92 mm was used for the separators. Adhesive tape was used around the entire circumferential surface of the flange portion of the generating unit 20 and the positive electrode current collecting member 31, and was made from hexamethacrylate adhesive applied as an insulating cover on one side of a backing material made of polyimide. One turn or more of this adhesive tape was wound around the outer circumferential surface of the generating unit 20 from the circumferential surface of the flange portion.

Aluminum of thickness 0.4 mm was used as the material for the cap case 37, and cutaways of 0.5 R were provided at the attachment bases of the protrusions 37c of the swaged portion. A ferrous material of thickness 0.6 mm that had been nickel plated to a thickness of around 5 μm was used as the material for the cap 3. The melting point of the cap case 37 was lower than the melting point of the cap 3. The dimensions of the protrusions 37c were: W1=9 mm; W2=7 mm; amount of projection from the flange 4.5 mm.

In the manufacture of the sealing lid 50, a rotation tool whose dimensions were set so that the diameter D of the end was 3.2 mm, the diameter d of the swollen portion at the center of the end surface of the rotation tool was half of the diameter D, i.e. 1.6 mm, and the height of the swollen portion was 0.1 mm was used. The spots that were joined by friction stir welding were the four protrusions 37c of the swaged portion 5.

The assembly of this lithium secondary cell 1 may be performed as follows. First, the sealing lid 50 is manufactured. In other words, the flange portion of the cap case 37 and the flange portion of the cap 3 are laid over one another, the flange portion of the cap case 37 is crimped back over the cap 3, and swage processing is performed at the flange 37b that is now on the upper surface. Next, using a rotation tool having a planar end surface and the central portion of which is somewhat bulged outwards into a spherical dome shape and a backup member (an anvil) that supports the swage processed portion from underneath, the rotation tool is pressed into contact with the protrusions 37c from the direction of their surfaces, and friction stir welding is performed so as to join them into single unified masses, and thereby the sealing lid 50 is manufactured.

After the generating unit 20 that has been manufactured as described above by winding the positive electrode 11 and the negative electrode 12 together with the intervention of the separators 13 and 14 has been inserted into the cell container 2, the negative electrode side is electrically connected, and the sealing lid 50 and the generating unit 20 are electrically connected together via the positive electrode conducting lead 33.

After filling in the non-aqueous electrolyte, the cell container 2 and the sealing lid 50 are sealed together via the gasket 43 by swage fixing.

A solution of 1 mol/liter of 6-lithium hexafluorophosphate (LiPF6) dissolved in a solvent mixture of ethylene carbonate (EC), dimethyl carbonate (DMC), and diethyl carbonate (DEC) is used as the non-aqueous electrolyte.

In this example, the lithium secondary cell 1 is set to have diameter of 40 mm, height of 110 mm, and capacity of 6 Ah.

—Comparison Example #1—

As Comparison Example #1, a sealed cell was manufactured using a prior art type sealing lid that was welded at the flange 37b without the provision of any protrusions 37c.

—Testing and Evaluation—

For the lithium secondary cell sealing lids that were manufactured in Example #1 and Comparison Example #1, the electrical resistances between the caps 3 and the central portions of the cap cases 37 were measured using a four line type measurement device, i.e. were measured by calculation from the voltage values when a current of 10 A was flowed between the cap 3 and the cap case 37. The result was that, with Example #1, the resistance value could be reduced by 20%.

—Comparison Example #2—

For a second comparison example, in a fourth embodiment that will be described hereinafter, the sealing lid was made without providing any necked down portions (i.e. any connecting portions 37b) at the base attachments of the protrusions 37c of the swaged portion.

—Testing and Evaluation—

For the lithium secondary cell sealing lids manufactured according to Example #1 and Comparison Example #2, evaluation was performed by checking the external appearance as to whether or not, during manufacture of the sealing lid, cracking or wrinkling had occurred in the base attachments of the protrusions 37c of the swaged portion.

With all of the sealing lids of Comparison Example #2 for which no necked down portions at the base attachments of the protrusions 37c were provided, cracking or wrinkling had occurred at the base attachments of the protrusions 37c. By contrast, no occurrence of wrinkling or cracking could be observed with the sealing lid of Example #1.

—Embodiment #2—

Figure 7:
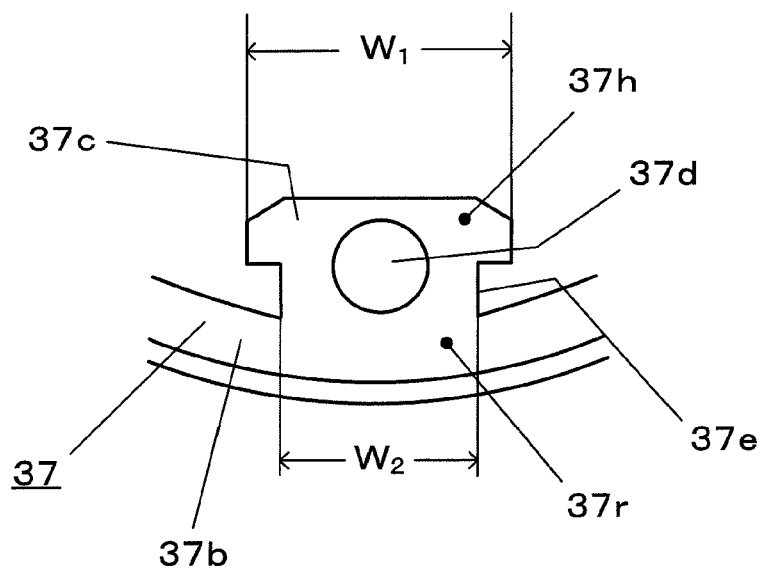
FIG. 7 is a plan view showing a protrusion of a second embodiment of the sealed cell of this invention.

A second embodiment of the sealed cell of the present invention is shown in FIG. 7. While with the first embodiment the notches 37e were approximately semicircular, in this embodiment they are shaped as rectangular. The same reference symbols are appended in this figure to portions that are the same or equivalent to portions of the first embodiment, and explanation thereof is omitted.

As shown in FIG. 7, notches 37e that are shaped as rectangles are formed in the connecting portions 37r between the protrusions 37c and the flange 37b, and the widths W2 of the connecting portions 37r in the circumferential direction are determined by these.

This second embodiment provides similar beneficial effects to those of the first embodiment.

—Embodiment #3—

Figure 8:
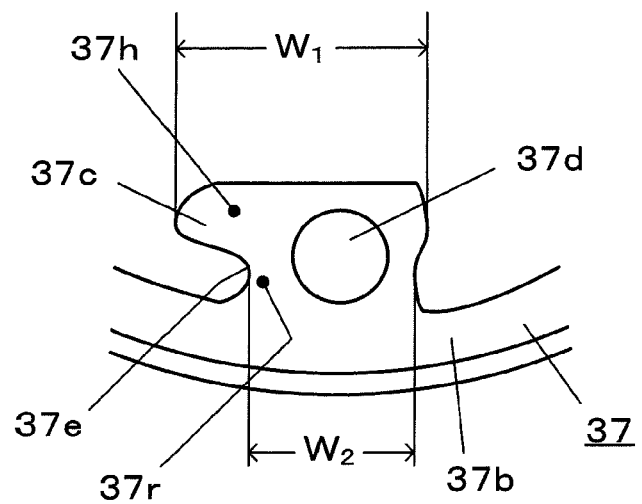
FIG. 8 is a plan view showing a protrusion of a third embodiment of the sealed cell of this invention.

A third embodiment of the sealed cell of the present invention is shown in FIG. 8. While, with the first and the second embodiments, the protrusions 37c were shaped symmetrically left and right, in this embodiment, the protrusions 37c are formed asymmetrically, substantially in letter-L shapes. The same reference symbols are appended in this figure to portions that are the same or equivalent to portions of the first embodiment, and explanation thereof is omitted.

As shown in FIG. 8, the protrusions 37c are formed asymmetrically, substantially in letter-L shapes, and deep notches 37e are formed in their flange 37b and the connecting portions 37r, so that the widths W2 in the circumferential direction of the connecting portions 37r are determined thereby.

This third embodiment provides similar beneficial effects to those of the first embodiment.

—Embodiment #4—

Figure 9:
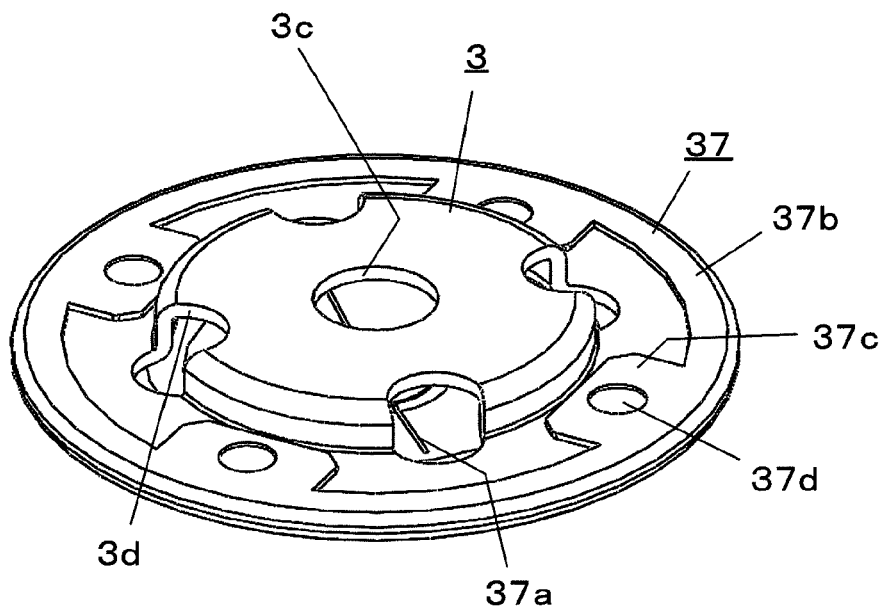
FIG. 9 is a plan view showing a sealing lid of a fourth embodiment of the sealed cell of this invention.
Figure 10:
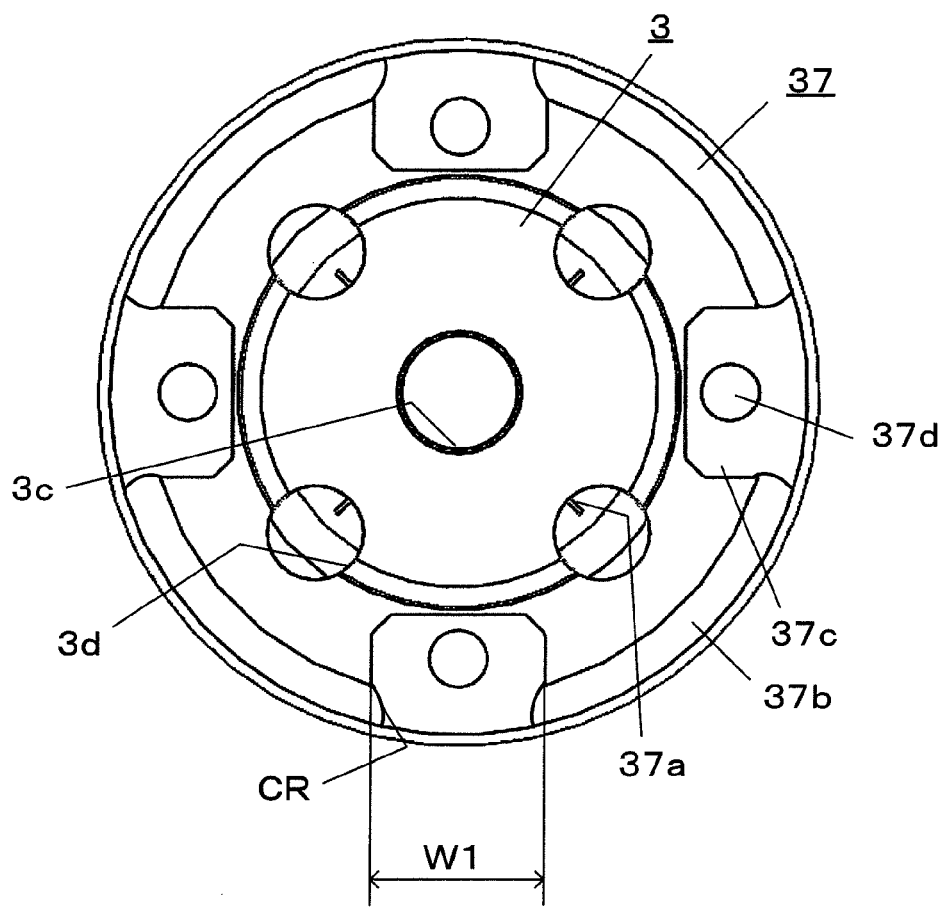
FIG. 10 is a plan view of a cap of FIG. 9.
Figure 11:
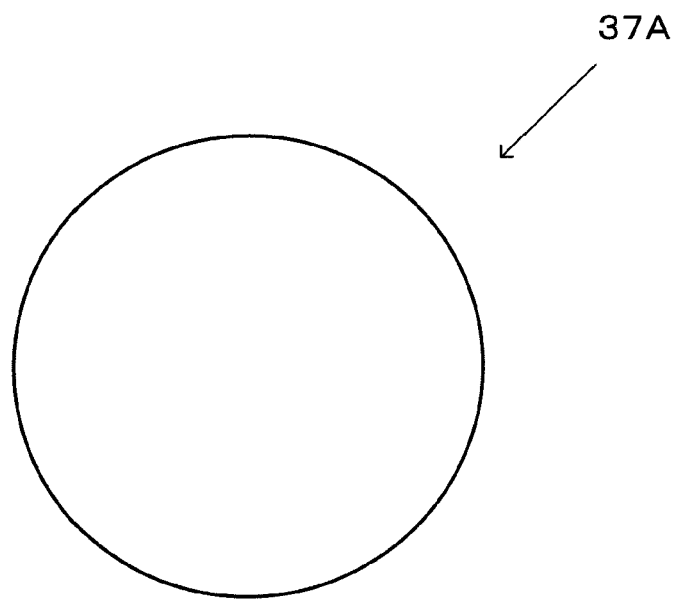
FIG. 11 is a plan view showing blank starting material for a cap case of the sealing lid of FIG. 4.

A fourth embodiment of the sealed cell of the present invention is shown in FIGS. 9 and 10. The same reference symbols are appended in these figures to portions that are the same or equivalent to ones of the first embodiment, and explanation thereof is omitted. While in the first through the third embodiments the connecting portions 37r were provided to the protrusions 37c, in this embodiment, no such connecting portions 37r are provided, but instead the protrusions 37c protrude directly from the flange 37b. In other words, in this embodiment, the notches 37e of the first through the third embodiments are omitted, and instead the protrusions 37c are formed in rectangular shapes and have constant width W1. With this secondary cell according to the fourth embodiment as well, it is possible to ensure sufficient welding area due to the provision of the protrusions 37c, and it is possible to reduce the resistance between the cap 3 and the cap case 37.

If, as in this fourth embodiment, no connecting portions of narrowed down width are provided to the protrusions 37c, then, when the flange 37b and the protrusions 37c are bent around along the upper surface of the cap 3, there is a fear of the occurrence of cracking CR at the corner portions between the protrusions 37c and the flange 37b. Accordingly, if the widths of the protrusions are constant and no connecting portions are provided, then the width dimension of the protrusions 37b is limited. However, since it is possible for the welded area to be made larger as compared with the case in which the flange 37b is swage processed to the cap 3 and welding is performed at predetermined spots upon the flange 37b, accordingly the advantageous effect is obtained that, in a similar manner to the embodiments described above, it is possible to reduce the resistance value between the cap case 37 and the cap 3.

—Variant Embodiments—

(1) While the protrusions 37c were welded to the cap 3 by friction stir welding in the embodiments described above, on the other hand, if the cap 3 and the cap case 37 are made from the same type of metal such as aluminum alloy, then it would also be acceptable to employ some other type of welding method such as laser beam welding or the like, (2) While, with the lithium secondary cells 1 of these embodiments, examples were disclosed in which the cap cases 37 were made from aluminum while the caps 3 were made from ferrous material upon which nickel plating was performed, this should not be considered as being limitative of the present invention. For example, it would also be acceptable to arrange to make the cap case 37 from aluminum alloy, and to make the cap 3 from carbon steel, stainless steel, or nickel. If this is done, it is possible to ensure that the cap case 37 has a lower melting point than that of the cap 3. While, by plating a soft metal such as nickel or copper or the like upon the cap 3, it is possible simply and easily to separate the oxidized surface layer of the cap 3 and thus to activate the interface and to provide a satisfactory junction, the use of carbon steel that has been nickel plated is desirable from the point of view of cost and so on.

(3) The provision of four of the protrusions 37c should not be considered as being limitative of the present invention. It will be sufficient if at least one or more protrusion is provided to extend from the inner peripheral edge of the flange 37b towards the center of the cap. In this case, the sizes and the number of the protrusions 37c should be determined on the basis of the design value for the resistance value between the cap 3 and the cap case 37. Desirably, the sizes of the welded regions 37d should also be determined in this way. Accordingly, provided that the required resistance value is made to be the same, the greater the number of the protrusions 37c, the smaller is it possible to make the sizes of the protrusions 37c and the sizes of the welding regions 37d. When consideration is given to reduction of the electrical resistance during high current discharge, it is desirable to provide a plurality of junction spots, so that it would also be acceptable to provide the protrusions 37c at six spots, or at eight spots.

(4) While, with these embodiments, an example was disclosed of the shape of the end portion of the rotation tool used for friction stir welding, this should not be considered as being limitative of the present invention; it would also be acceptable for this shape to be changed to match the size of the junction portions and so on.

(5) While, with the embodiments described above, four of the opening portions 3d were provided at symmetrical positions in four directions with their centers spaced mutually apart by 90°, it would also be possible to provide a larger number or a smaller number of opening portions, within the range that the strength of the cap 3 can be ensured and moreover that it is possible to ensure a sufficient amount of gas discharge; and it would also be acceptable for their arrangement to be asymmetric.

(6) While, with the lithium secondary cells 1 of these embodiments, examples were disclosed of the use of lithium manganate as the positive electrode active material, this should not be considered as being limitative of the present invention. Other than these embodiments, as the positive electrode active material that can be used, it would also be acceptable, for example, to employ a lithium nickel compound oxide or a lithium cobalt compound oxide or the like. Moreover while, in these embodiments, carbon particles were shown as an example of the negative electrode active material, this is not to be considered as being limitative of the present invention; it would also be acceptable to use a carbonaceous material such as the amorphous carbon used in a conventional lithium secondary cell, or graphite or the like.

(7) While, with the lithium secondary cells 1 of these embodiments, the example was disclosed of the use of a solution of 6-lithium hexafluorophosphate in a mixture solvent of ethylene carbonate or the like at around 1 mol/liter as the non-aqueous electrolyte, this should not be considered as being particularly limitative of the non-aqueous electrolyte that can be used with the present invention. Any organic solvent and any lithium salt that are normally used in a lithium ion secondary cell will be acceptable; for example, a lithium salt may be used that is dissolved in a solvent including either a single one of, or a mixture of, organic solvents such as carbonate series, sulfolane series, ether series, lactone series, and the like. Moreover, the mixing ratio of the organic solvents and the amount of lithium salt that is included are not to be considered as being particularly limited.

(8) While, with these embodiments, by way of example, lithium secondary cells 1 were disclosed having cell capacity of 6 Ah and capable of high current discharge, this should not be considered as being limitative of the present invention; the present invention can be appropriately applied to cells having cell capacity of 35 Ah or greater. Furthermore, in terms of use for high current discharge, the present invention may also, for example, be appropriately applied to a cell for an electric automobile that needs 500 amperes or more during engine starting; and the present invention is also appropriate for a power supply for a bicycle or the like that receives power assistance when ascending a slope. Moreover, the shape and size of the cell should not be considered as being particularly limited.

The present invention should not be considered as being limited in any way by any of the embodiments described above, provided that the essential characteristics of the present invention are preserved. Accordingly, the present invention may be applied to a sealed cell of various types, including a generating unit 20, a cell container 2 within which the generating unit 20 is housed, and a sealing lid 50 that seals the cell container 2, wherein: the sealing lid 50 includes a cap 3 having an external positive terminal, and a cap case 37 that is integrated with the cap 3; the cap case 37 includes a flange 37b that is crimped back to the cap upper surface at the external periphery of the cap 3, and a protrusion for welding 37c that projects from the inner circumferential edge of the flange 37b toward the center of the cap 3; and the cap 3 and the cap case 37 are welded together at the protrusion for welding 37c.

Furthermore, the present invention may be applied to methods of manufacturing a sealed cell of various types, including: a process of manufacturing a generating unit 20; a process of manufacturing a sealing lid 50 that seals a container 2 of the cell; a process of, after having loaded the generating unit 20 into the cell container 2, electrically connecting together the generating unit 20, an external positive terminal of the sealing lid 50, and an external negative terminal on the bottom surface of the cell; and a process of, after having loaded the generating unit 20 into the cell container 2, sealing the cell container 2 with the sealing lid 50; wherein the process of manufacture of the sealing lid 50 includes: a process of manufacturing a cap 3 having the external positive terminal; a process of manufacturing a cap case 37 that is integrated with the cap 3, having a flange 37b for swaging together the cap case 37 and the cap 3, and a protrusion 37c for welding together the cap case 37 and the cap 3; and a process of swaging the flange 37b to the cap 3, thus fixing together the cap 3 and the cap case 37 by swaging, and then welding the protrusion for welding 37c to the cap 3, thus integrating together the cap 3 and the cap case 37.

The invention claimed is:

1. A sealed cell comprising a generating unit, a cell container within which the generating unit is housed, and a sealing lid that seals the cell container, wherein:
    the sealing lid comprises a cap having an external positive terminal, and a cap case that is integrated with the cap;
    the cap case comprises a flange that is crimped back to a cap upper surface at an external periphery of the cap, and a protrusion for welding that projects from an inner circumferential edge of the flange toward a center of the cap; and
    the cap and the cap case are welded together at the protrusion for welding;
    wherein the protrusion for welding comprises a connecting portion that is connected to the flange, and an end portion that is widened out from the connecting portion towards the center of the cap; and
    wherein a length of the connecting portion in a circumferential direction of the cap case is made to be shorter than a length of the end portion in the circumferential direction.

2. A sealed cell according to claim 1, wherein
    the protrusion for welding is welded to the cap by friction stir welding.

3. A method of manufacturing a sealed cell, comprising:
    a process of manufacturing a generating unit;
    a process of manufacturing a sealing lid that seals a container of the cell;
    a process of electrically connecting together the generating unit, an external positive terminal of the sealing lid and an external negative terminal on a bottom surface of the cell after having loaded the generating unit into the cell container; and
    a process of sealing the cell container with the sealing lid after having loaded the generating unit into the cell container; wherein
    the process of manufacture of the sealing lid comprises:
    a process of manufacturing a cap having the external positive terminal;
    a process of manufacturing a cap case that is integrated with the cap, the cap case having a flange for swaging together the cap case and the cap, and a protrusion for welding together the cap case and the cap; and
    a process of swaging the flange to the cap so as to fix together the cap and the cap case by swaging, and integrating together the cap and the cap case by welding the protrusion for welding to the cap;
    wherein in the process of manufacture of the cap case, the protrusion for welding is formed so as to project from the flange along an upper surface of the cap; and
    wherein the protrusion for welding comprises a connecting portion that is connected to the flange, and an end portion that is widened out from the connecting portion towards the center of the cap, and a length of the connecting portion in a circumferential direction of the cap case is made to be shorter than a length of the end portion in the circumferential direction.

4. A method of manufacturing a sealed cell according to claim 3, wherein the protrusion for welding is welded to the cap by friction stir welding.

* * * * *